US010766612B2

(12) United States Patent
Rauber et al.

(10) Patent No.: US 10,766,612 B2
(45) Date of Patent: Sep. 8, 2020

(54) ROTOR HUB ASSEMBLY WITH UNIVERSAL JOINT

(71) Applicant: Bell Helicopter Textron Inc., Fort Worth, TX (US)

(72) Inventors: Richard E. Rauber, Euless, TX (US); Frank Bradley Stamps, Colleyville, TX (US)

(73) Assignee: Textron Innovations Inc., Providence, RI (US)

( * ) Notice: Subject to any disclaimer, the term of this patent is extended or adjusted under 35 U.S.C. 154(b) by 369 days.

(21) Appl. No.: 15/658,190

(22) Filed: Jul. 24, 2017

(65) Prior Publication Data

US 2019/0023386 A1 Jan. 24, 2019

(51) Int. Cl.
*B64C 27/35* (2006.01)
*B64C 27/14* (2006.01)
*B64C 27/41* (2006.01)

(52) U.S. Cl.
CPC .............. *B64C 27/35* (2013.01); *B64C 27/14* (2013.01); *B64C 27/41* (2013.01)

(58) Field of Classification Search
CPC .......... F01D 5/26; B64C 27/37; B64C 27/12; B64C 11/34; B64C 27/605
USPC ................................................. 416/140, 131
See application file for complete search history.

(56) References Cited

U.S. PATENT DOCUMENTS

| 5,074,494 A * | 12/1991 | Doolin ................... B64C 27/605 244/17.25 |
| 5,083,725 A * | 1/1992 | Byrnes ................... B64C 27/605 244/17.25 |
| 5,215,502 A | 6/1993 | Neathery et al. |
| 9,382,001 B2 | 7/2016 | Foskey et al. |
| 2010/0266411 A1* | 10/2010 | Stamps ............... B64C 29/0033 416/131 |
| 2015/0053814 A1* | 2/2015 | Stamps ..................... F16D 3/42 244/17.11 |
| 2016/0023752 A1* | 1/2016 | Foskey ................... B64C 27/35 464/157 |
| 2018/0273160 A1* | 9/2018 | Baldwin ............... B64C 27/605 |

OTHER PUBLICATIONS

European Search Report in related European Patent Application No. 18180551.6 dated Oct. 26, 2018, 4 pages.
Exam Report in related European Patent Application No. 18180551.6 dated Nov. 20, 2018, 9 pages.
Exam Report in related European Patent Application No. 18180551.6 dated May 7, 2019, 2 pages. (Invitation Pursuant to Rule 137(4) EPC and Article 94(3) EPC).
Exam Report in related European Patent Application No. 18180551.6 dated Oct. 21, 2019, 3 pages.

* cited by examiner

*Primary Examiner* — Aaron R Eastman
(74) *Attorney, Agent, or Firm* — Lightfoot & Alford PLLC (57) ABSTRACT

A rotor hub assembly that includes a yoke configured to attach blades thereto, a universal joint configured to attach to, and transmit forces between, a mast and the yoke, and an elastomeric member configured to attenuate vibrations transmitted from the universal joint to the mast.

10 Claims, 9 Drawing Sheets

ROTOR HUB ASSEMBLY WITH UNIVERSAL JOINT

BACKGROUND

Rotorcraft often utilize a gimbaled drive joint to allow the axis of rotation of the rotor hub to vary relative to the mast axis. These gimbaled drive joints may utilize universal joints (also known as a Hooke's joint or a Cardin joint) to accomplish the variable axis of rotation. However, the universal joints produce an undesirable two per revolution ("2/rev") torsional drive force. In the past, two-bladed helicopters dealt with these torsional 2/rev forces that originate in the gimbaled hub flapping joint by tuning the drive train to avoid 2/rev resonances by using long slender masts that were torsionally soft. These long, thin, torsionally soft masts would attenuate the vibration. The long torsionally soft mast and careful tuning of all the drive elements of the rotor drive train have been used to produce helicopters that can run for thousands of hours with no issues from the torsional 2/rev forces and motions that are inherent in two-bladed rotor systems. However, tiltrotor aircraft require very stiff hubs in the chord wise direction and very stiff masts, pylons, and wings to prevent whirl flutter instability problems in the rotor system during high speed airplane flight. As such, the ability to attenuate the 2/rev vibration via long torsionally soft masts is not possible in tiltrotor aircraft. In a prior tiltrotor aircraft, it was attempted to solve the 2/rev dilemma by utilizing a true constant velocity joint instead of a simpler universal joint. However, even the true constant velocity joint produced unwanted 2/rev vibrations. In order to reduce the overall rotor hub 2/rev vibrations to a tolerable level, a pair of very heavy pendulum assemblies and additional vibration treatment were required. As such, there is a need to develop a simple, lightweight, gimbaled rotor hub assembly that will attenuate the 2/rev vibrations.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The solution presented in this disclosure solves the dilemma of 2/rev vibrations in a gimbaled rotor hub by using a rotor hub assembly with a universal joint and an elastomeric mast joint that may be used to tune the natural frequency away from the 2/rev torsional oscillatory drive forces that are generated by the universal joint. This simplified solution will not only save money, but will also save a substantial amount of weight. While the disclosed rotor hub assembly may be used on any rotorcraft, it is particularly well-suited for use on tiltrotor aircraft.

Figure 1:
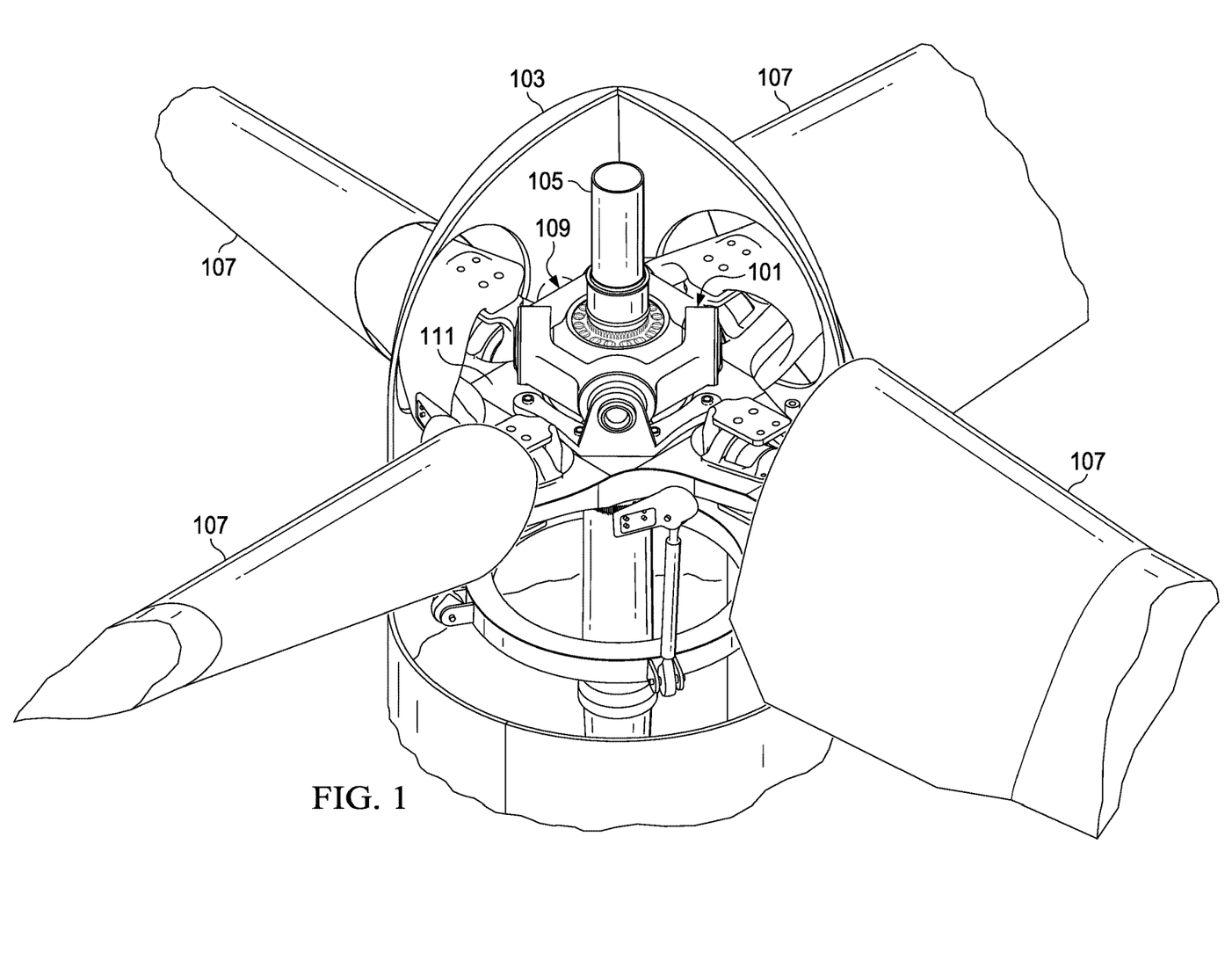
FIG. 1 is an oblique view of a rotor hub assembly according to this disclosure.
Figure 2:
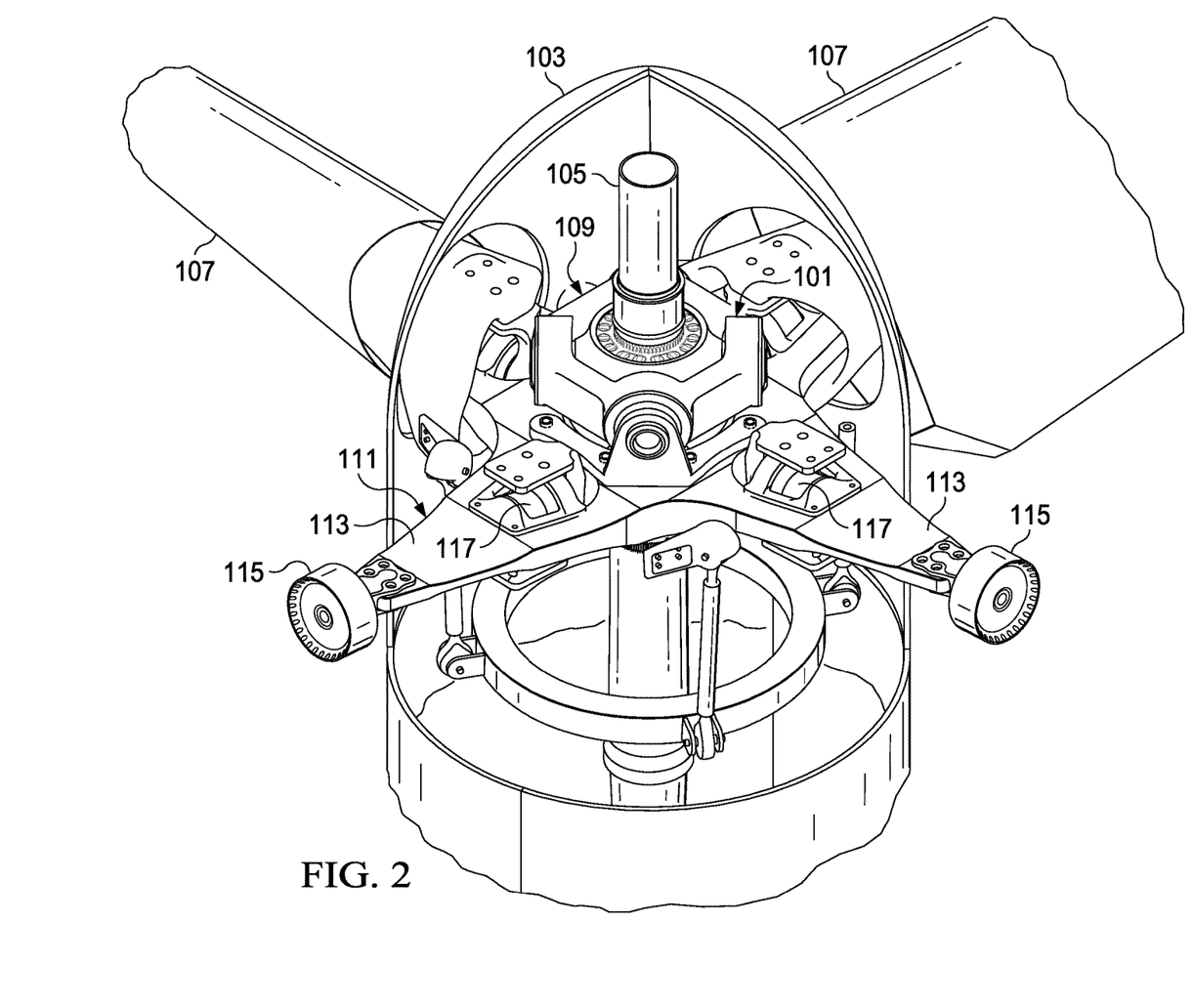
FIG. 2 is an oblique view of the rotor hub assembly of FIG. 1.

As shown in FIGS. 1 and 2, a rotor hub assembly 101 is illustrated. Rotor hub assembly 101 is show optionally disposed within a shroud 103 (shown cut-away). Rotor hub assembly 101 is attached to a rotor mast 105 to facilitate the transmission of torque from a powerplant to cause the rotation of blades 107, thereby generating lift and/or thrust. Rotor hub assembly 101 includes a universal joint 109 attached to a yoke 111. Universal joint 109 permits yoke 111 to rotate about an axis of rotation that is free to move relative to the axis of rotation of rotor mast 105. Yoke 111 includes four arms 113 extending therefrom to support blades 107. As shown, arms 113 may include structure to facilitate the attachment of outboard shear/CF bearings 115 as well as inboard pitch bearings 117.

Figure 3:
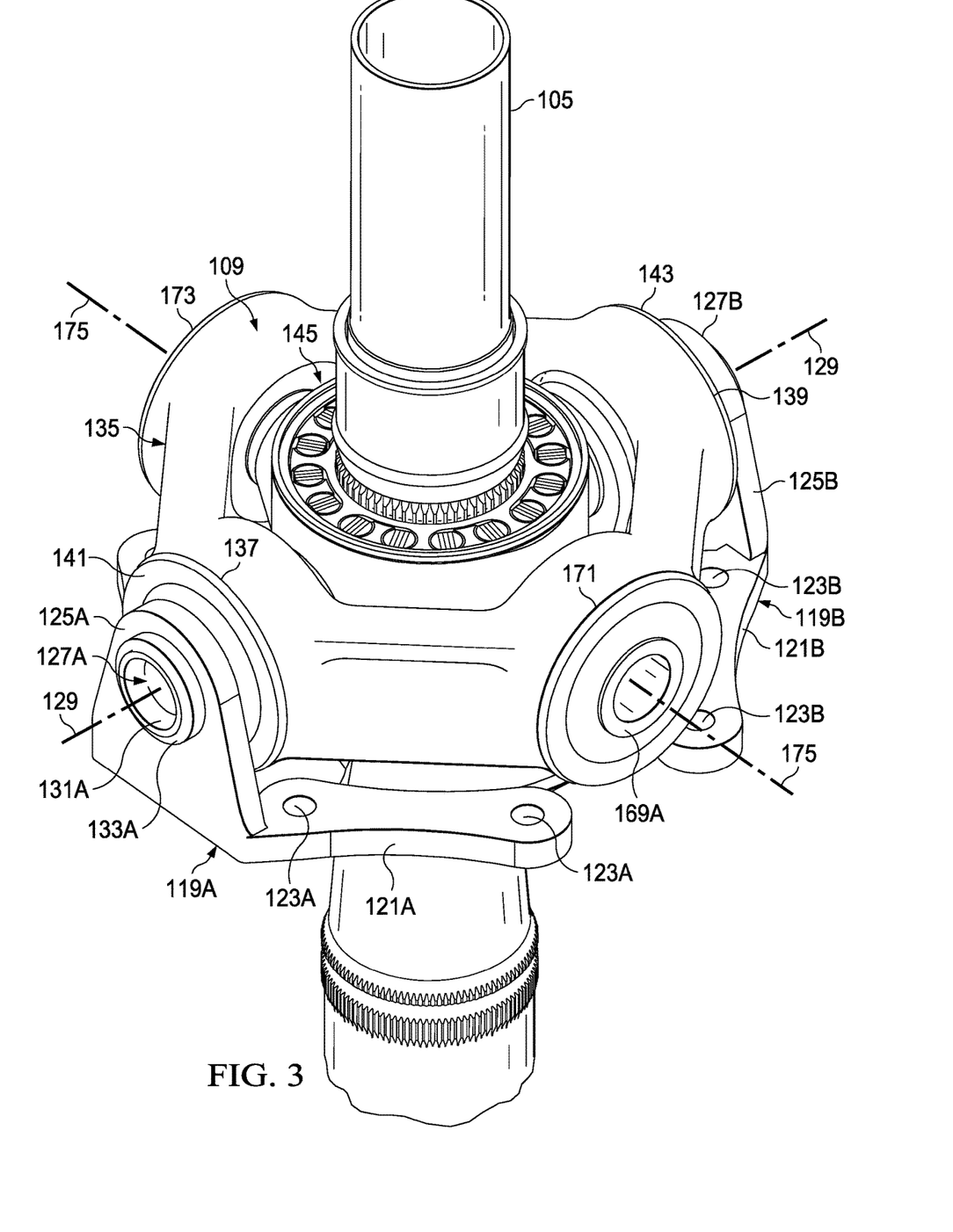
FIG. 3 is an oblique view of a portion of the rotor hub assembly of FIGS. 1 and 2.

FIG. 3 illustrates universal joint 109 attached to rotor mast 105. Universal joint 109 includes a pair of yoke brackets 119A, 119B. While yoke brackets 119A, 119B are shown as a pair, it should be understood that yoke brackets 119A, 119B could be one unitary yoke bracket. Each yoke bracket 119A, 119B includes a base 121A, 121B for providing a stable connection with yoke 111. Bases 121A, 121B include a plurality of openings 123A, 123B extending therethrough to accept hardware for attaching yoke brackets 119A, 119B to yoke 111. Extending from bases 121A, 121B are tabs 125A, 125B. Tabs 125A, 125B define openings 127A, 127B extending therethrough. Opening 127A and opening 127B are coaxial along a central longitudinal axis 129. Each opening 127A, 127B is configured to receive a hinge pin 131A, 131B and a radial bearing 133A, 133B therein. Hinge pins 131A, 131B connect yoke brackets 119A, 119B to a cross member 135 via a first aperture 137 and a second aperture 139. First aperture 137 and second aperture 139 are also coaxial about central longitudinal axis 129. Hinge pin 131A extends from opening 127A to first aperture 137. First aperture 137 may also include a radial bearing 141 configured to facilitate rotation of hinge pin 131A therein. Similarly, second aperture 139 may include a radial bearing 143 configured to facilitate rotation of hinge pin 131B therein. Universal joint 109 also includes a drive member 145 configured to transfer torque from rotor mast 105 to cross member 135.

Figure 4:
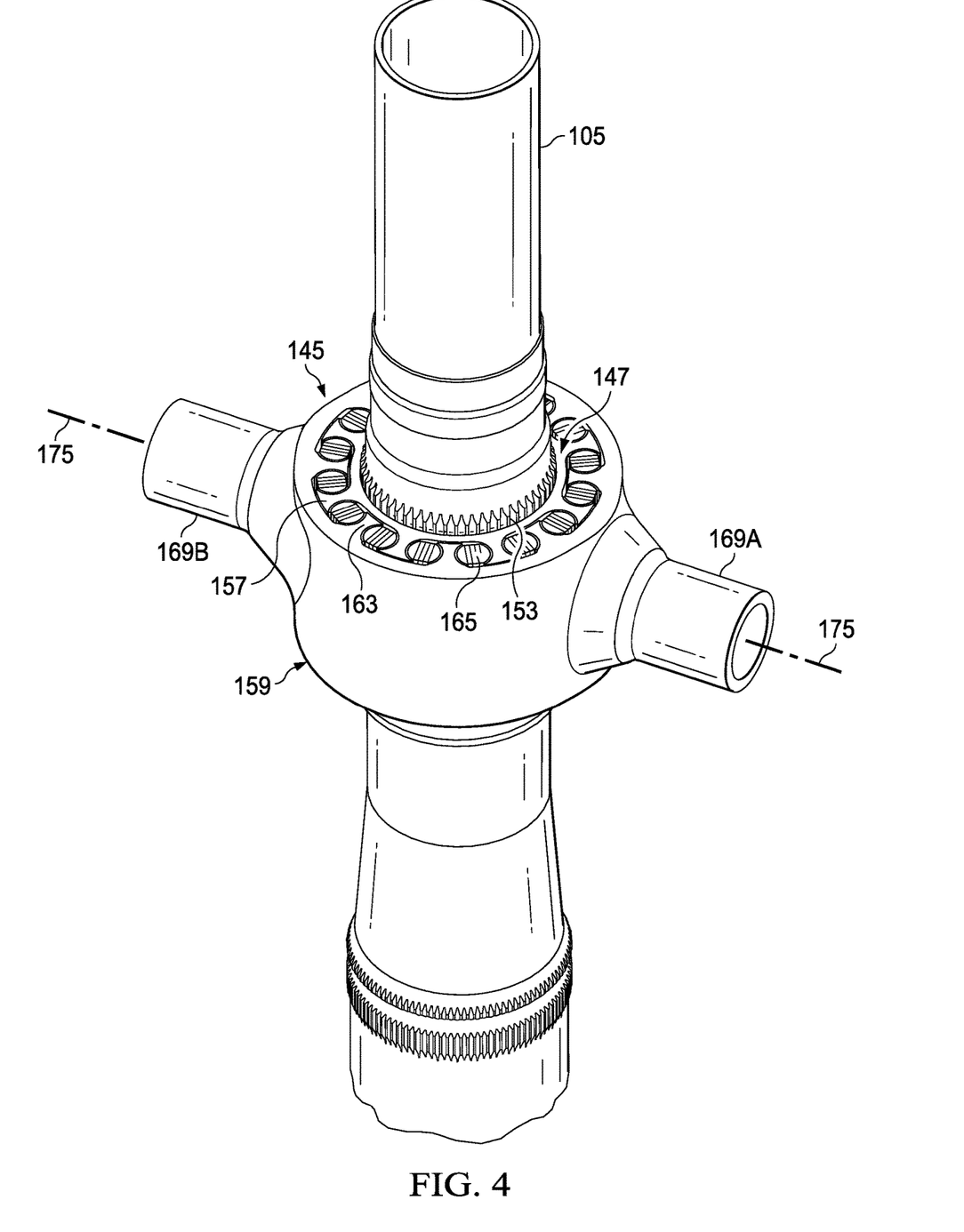
FIG. 4 is an oblique view of a portion of the rotor hub assembly of FIGS. 1-3.
Figure 5:
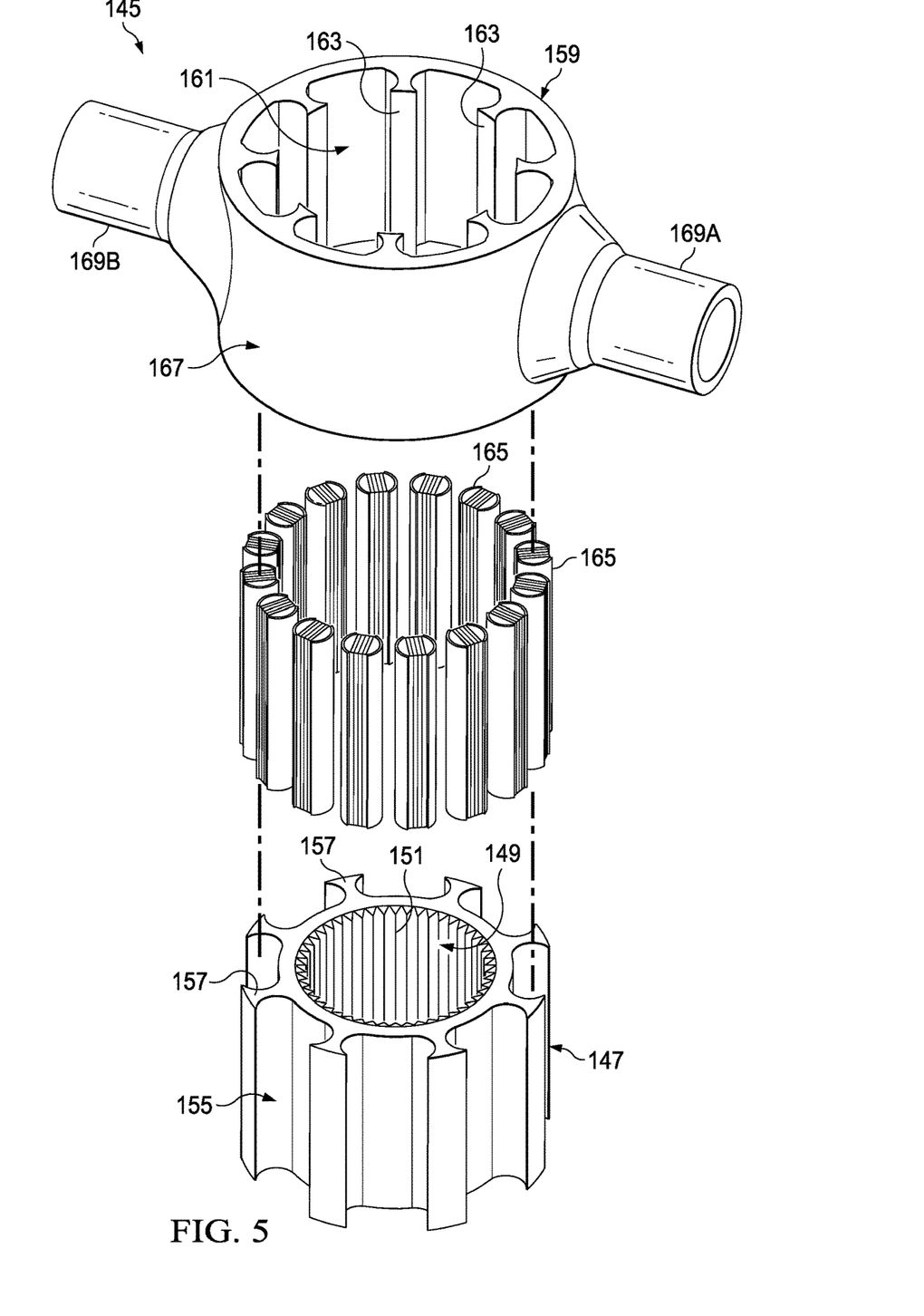
FIG. 5 is an exploded view of a portion of the rotor hub assembly of FIGS. 1-4.

Referring to FIGS. 4 and 5, drive member 145 is shown in more detail. Drive member 145 includes an inner member 147 having an inner surface 149 configured to engage rotor mast 105. This engagement may be accomplished via the use of splines 151 on inner surface 149 and complementary splines 153 on rotor mast 105. Inner member 147 has an outer surface 155 that includes a plurality of projections 157 extending therefrom. Drive member 145 also includes an outer member 159 surrounding inner member 147. Outer member 159 includes an inner surface 161 that includes a plurality of projections 163 extending therefrom, such that projections 163 interlace with projections 157. A plurality of elastomeric members 165 are disposed between the interlaced projections 157 and 163. Outer member 159 also includes an outer surface 167 with a pair of trunnions 169A, 169B extending therefrom. As shown in FIG. 3, trunnion 169A extends into a third aperture 171 of cross member 135, and trunnion 169B extends in a fourth aperture 173 of cross member 135, wherein third aperture 171 and fourth aperture 173 are coaxial about central longitudinal axis 175. Accordingly, cross member 135 is pivotally attached to drive member 145 about central longitudinal axis 175.

Figure 6:
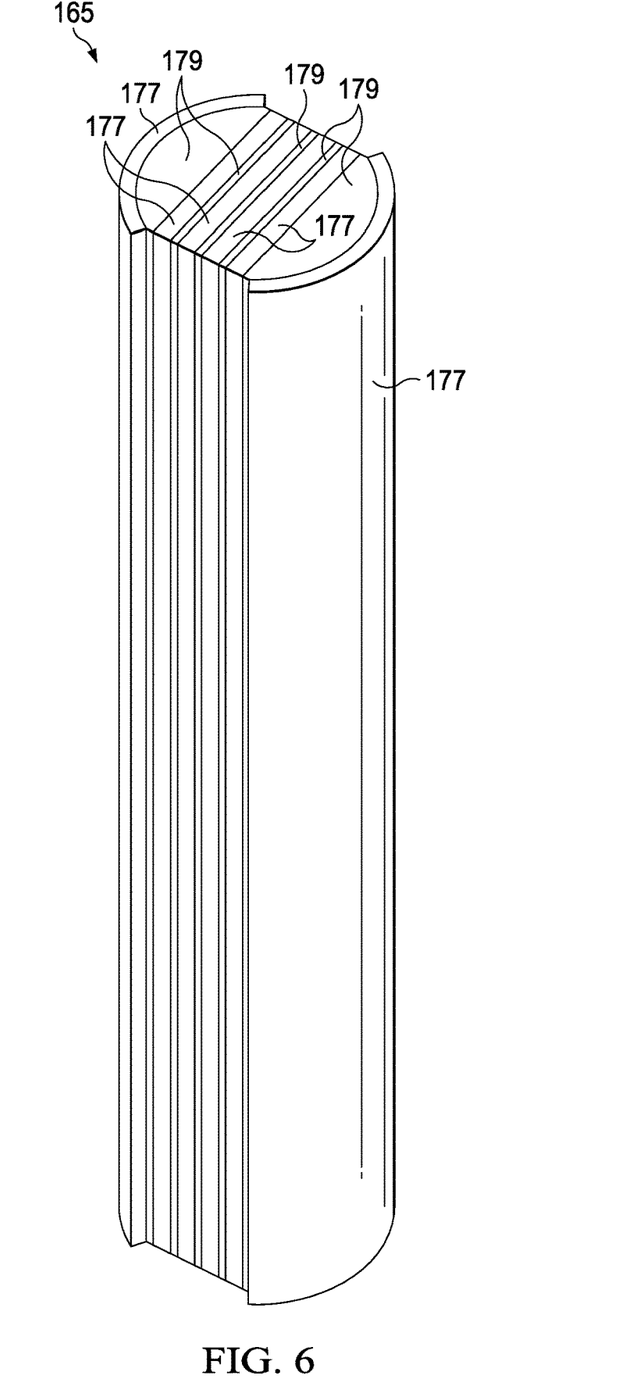
FIG. 6 is an oblique view of an elastomeric member of the rotor hub assembly of FIGS. 1-5.

As shown in FIG. 6, elastomeric members 165 may be made of alternating layers of elastomeric material 177 and rigid material 179. Elastomeric material 177 may comprise natural or synthetic rubber, or any other elastomeric material suitable for such application. Rigid material 179 may be formed of metal, plastic, composite, or any other material suitable for such application.

In operation, torque is transmitted through rotor mast 105 to drive member 145, cross member 135, yoke brackets 119A, 119B, and yoke 111, which rotates blades 107. When yoke 111 rotates about an axis that is not coincident with the axis of rotation of rotor mast 105, 2/rev oscillations are generated by universal joint 109. These 2/rev oscillations are attenuated by tuning elastomeric members 165 to absorb them in compression, rather than allowing the oscillations to be transmitted down rotor mast 105 to the drivetrain.

Figure 7:
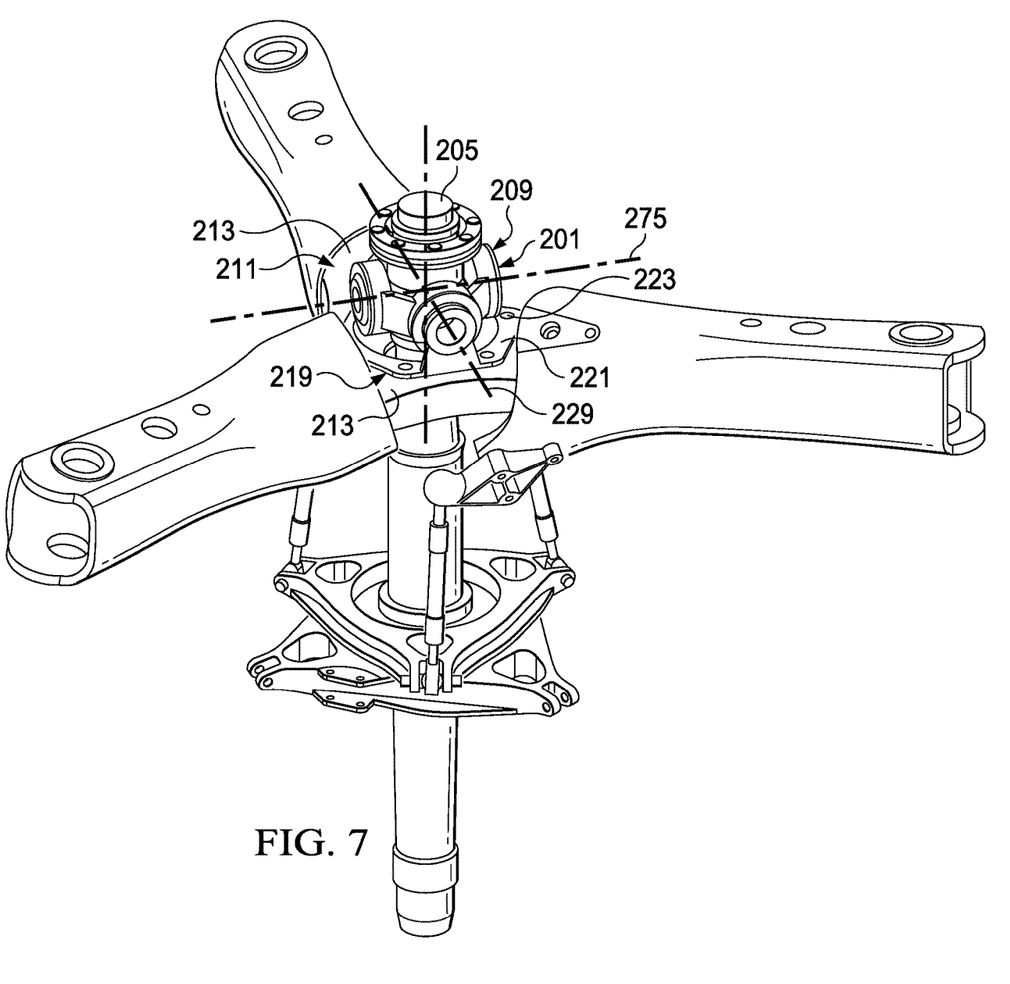
FIG. 7 is an oblique view of another rotor hub assembly according to this disclosure.
Figure 8:
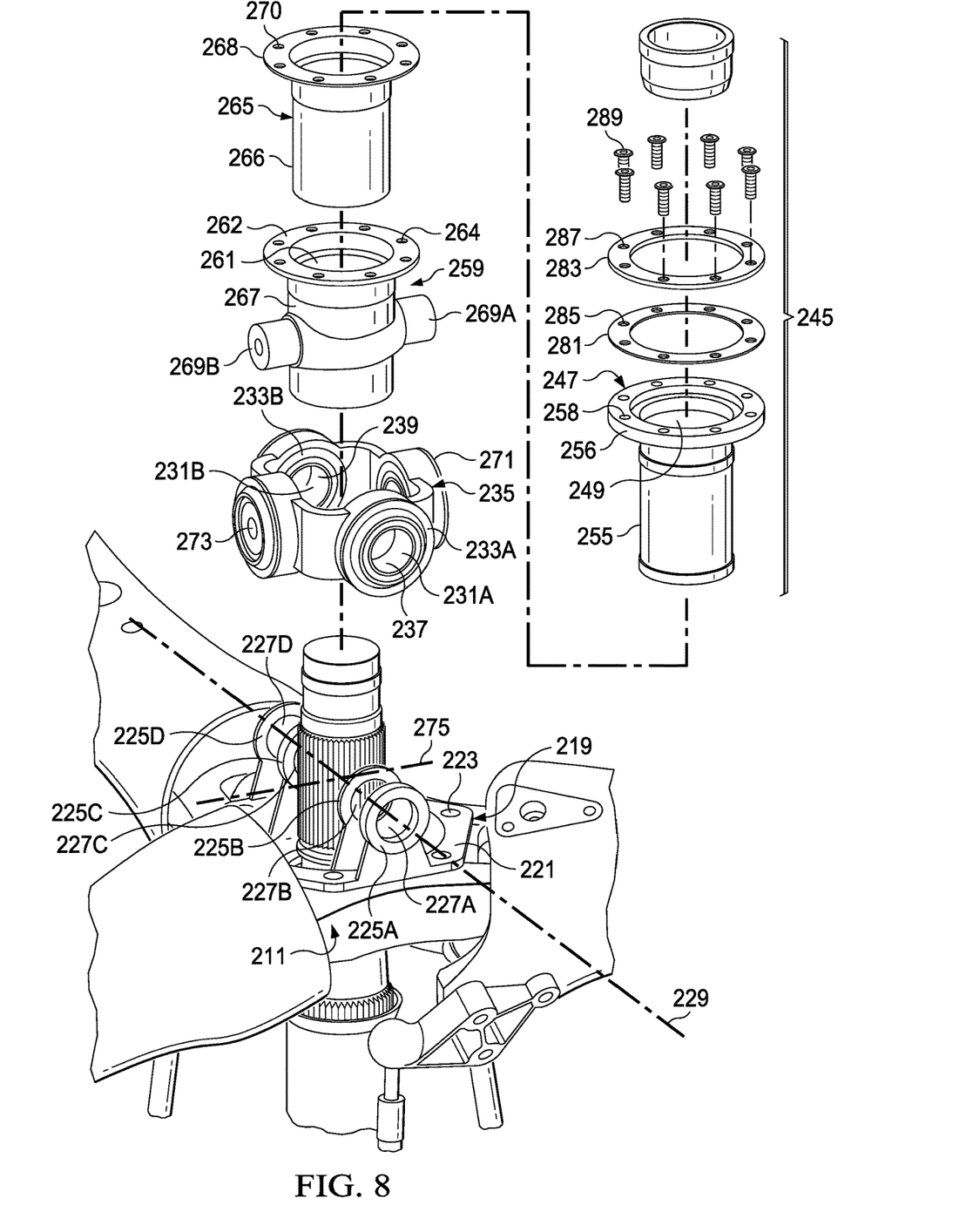
FIG. 8 is an exploded view of the rotor hub assembly of FIG. 7.

Referring to FIGS. 7 and 8, a rotor hub assembly 201 is illustrated. Rotor hub assembly 201 is attached to a rotor mast 205 to facilitate the transmission of torque from a powerplant to cause the rotation of blades (not shown), thereby generating lift and/or thrust. Rotor hub assembly 201 includes a universal joint 209 attached to a yoke 211. Universal joint 209 permits yoke 211 to rotate about an axis of rotation that is free to move relative to the axis of rotation of rotor mast 205. Yoke 211 includes three arms 213 extending therefrom to support the blades. Universal joint 209 includes a yoke bracket 219. Yoke bracket 219 includes a base 221 for providing a stable connection with yoke 211. Base 221 includes a plurality of openings 223 extending therethrough to accept hardware for attaching yoke bracket 219 to yoke 211. Extending from base 221 are tabs 225A, 225B, 225C, 225D. Tabs 225A, 225B, 225C, 225D define openings 227A, 227B, 227C, 227D extending therethrough, respectively. Openings 227A, 227B, 227C, 227D are coaxial along a central longitudinal axis 229. Openings 227A and 227B are configured to receive a hinge pin 231A and a radial bearing 233A therein. And openings 227C and 227D are configured to receive a hinge pin 231B and a radial bearing 233B therein. Hinge pins 231A, 231B connect yoke bracket 219 to a cross member 235 via a first aperture 237 and a second aperture 239. First aperture 237 and second aperture 239 are also coaxial about central longitudinal axis 229. Hinge pin 231A extends from opening 227A through first aperture 237 to opening 227B. Hinge pin 231B extends from opening 227C through second aperture 239 to opening 227D. Universal joint 209 also includes a drive member 245 configured to transfer torque from rotor mast 205 to cross member 235.

Figure 9:
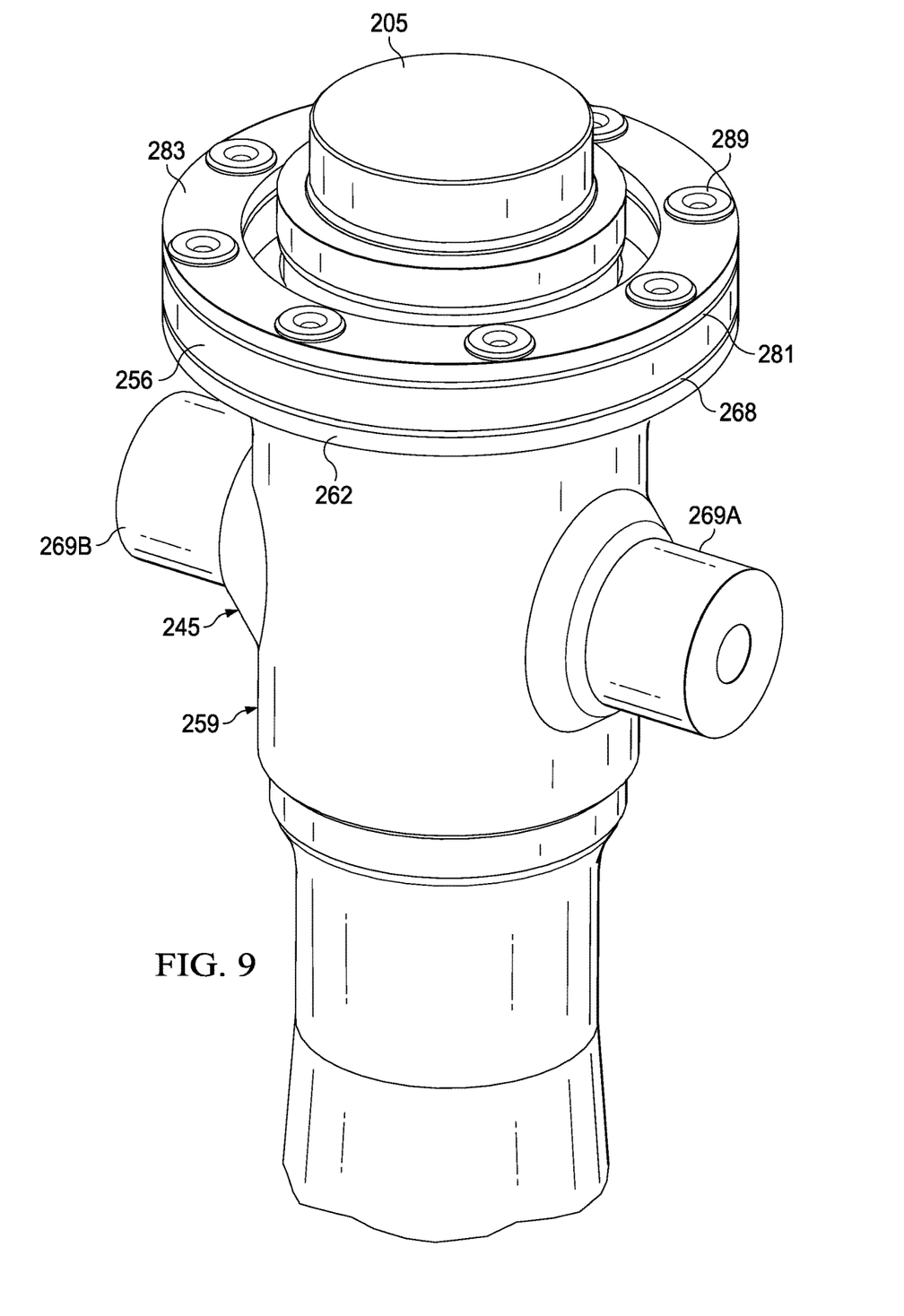
FIG. 9 is an oblique view of a portion of the rotor mast assembly of FIGS. 7 and 8.

Referring to FIGS. 8 and 9, drive member 245 includes an inner member 247 having an inner surface 249 configured to engage rotor mast 205. Inner member 247 has a substantially cylindrical outer surface 255. Inner member 247 also includes a flange 256 extending radially therefrom. Flange 256 defines a plurality of openings 258 extending therethrough. Drive member 245 also includes an outer member 259 surrounding inner member 247. Outer member 259 includes a substantially cylindrical inner surface 261. Outer member 259 also includes a flange 262 extending radially therefrom. Flange 262 includes a plurality of openings 264 extending therethrough. An elastomeric member 265 is located between inner member 247 and outer member 259. The elastomeric member 265 includes a hollow cylindrical portion 266 configured to fit between substantially cylindrical outer surface 255 of inner member 247 and substantially cylindrical inner surface 261 of outer member 259. Elastomeric member 265 includes a flange 268 extending therefrom. Flange 268 includes a plurality of openings 270 extending therethrough. Outer member 259 also includes an outer surface 267 with a pair of trunnions 269A, 269B extending therefrom. Trunnion 269A extends into a third aperture 271 of cross member 235, and trunnion 269B extends in a fourth aperture 273 of cross member 235, wherein third aperture 271 and fourth aperture 273 are coaxial about a central longitudinal axis 275. Accordingly, cross member 235 is pivotally attached to drive member 245 about central longitudinal axis 275.

Drive member 245 may also include an elastomeric ring 281 and an inelastic ring 283. Elastomeric ring 281 and inelastic ring 283 each include a plurality of openings extending therethrough, 285 and 287, respectively. When assembled, flange 262 of outer member 259 has flange 268 of elastomeric member 265 on top thereof, followed by flange 256 of inner member 247, then elastomeric ring 281, and finally inelastic ring 283 on the top. Flanges 262, 268, 256 and rings 281, 283 are aligned such that openings 264, 270, 258, 285, 287 are aligned and receive connection bolts 289 therethrough.

In operation, torque is transmitted through rotor mast 205, drive member 245, cross member 235, yoke bracket 219, and yoke 211, to rotate the blades. When yoke 211 rotates about an axis that is not coincident with the axis of rotation of rotor mast 205, 2/rev oscillations are generated by universal joint 209. These 2/rev oscillations are attenuated by tuning elastomeric member 265 and elastomeric ring 281 to absorb them in shear, rather than allowing the oscillations to be transmitted down rotor mast 205 to the drivetrain. Additional elastomeric rings 281 and inelastic rings 283 may be added as required.

In the embodiments shown, the drive members and cross members show the masts passing through the centers thereof. It should be understood that the drive member could be mounted to a distal end of the mast. In addition, axis about which the cross member is pivotally attached to the yoke bracket could be above or below the drive member.

At least one embodiment is disclosed, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A rotor hub assembly, comprising:
   a yoke having at least two arms extending therefrom;
   a yoke bracket having a base attached to the yoke, the yoke bracket including a tab extending from the base, the tab defining an opening extending therethrough;
   a cross member defining a first aperture and a second aperture coaxially aligned with each other, and further defining a third aperture, the first and second apertures being orthogonal to the third aperture;
   a drive member, comprising:
      an inner member having an outer surface, the outer surface including a first plurality of projections extending therefrom;
      an outer member having an outer surface and an opposite inner surface, the inner surface including a second plurality of projections extending therefrom, the outer member being configured to surround the inner member such that the second plurality of projections interlace with the first plurality of projections, the outer member also including a pair of trunnions extending from the outer surface thereof, the trunnions being positioned coaxially within the first and second apertures of the cross member; and
      a plurality of elastomeric members, each elastomeric member being configured to fit between one of the first projections and one of the second projections; and
   a hinge pin, the hinge pin being positioned coaxially within the opening of the tab of the yoke bracket and the second aperture of the cross member.

2. The rotor hub assembly of claim 1, further comprising:
   a second yoke bracket having a second base attached to the yoke, the second yoke bracket including a second tab extending therefrom, the second tab defining a second opening extending therethrough; and
   a second hinge pin, the second hinge pin being positioned coaxially within the second opening of the second tab and a fourth aperture of the cross member.

3. The rotor hub assembly of claim 2, wherein each of the plurality of elastomeric members have alternating layers of elastomeric and inelastic material.

4. The rotor hub assembly of claim 3, wherein the inner member includes a splined inner surface configured to engage a mast.

5. The rotor hub assembly of claim 4, wherein the third and fourth apertures are coaxial, and a central longitudinal axis of the third and fourth apertures is coplanar with a central longitudinal axis of the first and second apertures.

6. The rotor hub assembly of claim 5, wherein the elastomeric members are configured to attenuate 2/rev vibrations.

7. The rotor hub assembly of claim 6, wherein the yoke includes four arms extending therefrom.

8. A rotor hub assembly, comprising:
   a yoke configured to attach blades thereto;
   a universal joint configured to attach to, and transmit forces between, a mast and the yoke, the universal joint comprising;
      a cross member defining a first aperture with a first central longitudinal axis and a second aperture with a second central longitudinal axis, the first central longitudinal axis being orthogonal to the second central longitudinal axis;
      a yoke bracket attached to the yoke and pivotally attaching the cross member to the yoke bracket about the first central longitudinal axis; and
      a drive member pivotally attached to the cross member about the second central longitudinal axis, the drive member comprising:
         an inner drive member configured to engage the mast and comprising an outer surface having a plurality of first projections extending therefrom; and
         an outer drive member comprising an inner surface having a plurality of second projections extending therefrom, the outer drive member being configured to surround the inner drive member, such that the second projections interlace with the first projections; and
      a plurality of elastomeric members, each adjacent pair of the elastomeric members being located on circumferentially opposing sides of each first projection or of each second projection and configured to attenuate vibrations being transmitted from the universal joint to the mast.

9. The rotor hub assembly of claim 8, wherein the elastomeric member has alternating layers of elastomeric and inelastic material.

10. The rotor hub assembly of claim 8, wherein the elastomeric member is configured to attenuate 2/rev vibrations.

* * * * *